US012618466B2

(12) United States Patent
Lenaerts et al.

(10) Patent No.: US 12,618,466 B2
(45) Date of Patent: May 5, 2026

(54) SYSTEM AND METHOD FOR CALIBRATING TRANSMISSION

(71) Applicant: Dana Belgium N.V., Bruges (BE)

(72) Inventors: Nicolas Lenaerts, Bruges (BE); Christophe De Buyser, Veldegem (BE); Laurens De Bruyne, Midelkerke (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 19/003,626

(22) Filed: Dec. 27, 2024

(65) Prior Publication Data

US 2026/0117860 A1     Apr. 30, 2026

Related U.S. Application Data

(60) Provisional application No. 63/558,966, filed on Feb. 28, 2024.

(51) Int. Cl.
*F16H 61/06* (2006.01)
*F16D 48/02* (2006.01)
*F16H 61/686* (2006.01)

(52) U.S. Cl.
CPC ........... *F16H 61/061* (2013.01); *F16D 48/02* (2013.01); *F16H 61/686* (2013.01); *F16D 2048/0221* (2013.01)

(58) Field of Classification Search
CPC ........... F16H 61/0021; F16H 2061/062; F16D 48/066; F16D 2500/10412; F16D 2500/1026
See application file for complete search history.

(56) References Cited

U.S. PATENT DOCUMENTS

| | | | |
|---|---|---|---|
| 5,580,332 A | 12/1996 | Mitchell et al. | |
| 5,853,076 A * | 12/1998 | McKee ................. | F16H 61/061 |
| | | | 477/79 |
| 6,216,074 B1 | 4/2001 | Hillman et al. | |
| 6,971,971 B2 * | 12/2005 | Duskunovic .......... | F16H 61/061 |
| | | | 477/169 |
| 9,488,267 B2 * | 11/2016 | Yanakiev ................ | F16D 48/06 |
| 9,829,411 B2 | 11/2017 | Fujii et al. | |
| 10,767,712 B2 * | 9/2020 | Maessen .............. | F16D 48/066 |
| 2011/0196589 A1 | 8/2011 | Urban et al. | |
| 2012/0158264 A1 | 6/2012 | Kuras et al. | |

FOREIGN PATENT DOCUMENTS

| | | |
|---|---|---|
| CN | 103477107 A | 12/2013 |
| DE | 102008041353 A1 | 2/2010 |

\* cited by examiner

*Primary Examiner* — Huan Le
(74) *Attorney, Agent, or Firm* — McCoy Russell LLP

(57) ABSTRACT

A method and system for automatically estimating clutch control parameters is described. In one example, a torque source is operated in a speed control mode so that changes in torque source torque output may be indicative of torque transfer through a clutch. Torque source torque output values may be a basis for estimating clutch fill time and clutch touch pressure.

20 Claims, 9 Drawing Sheets

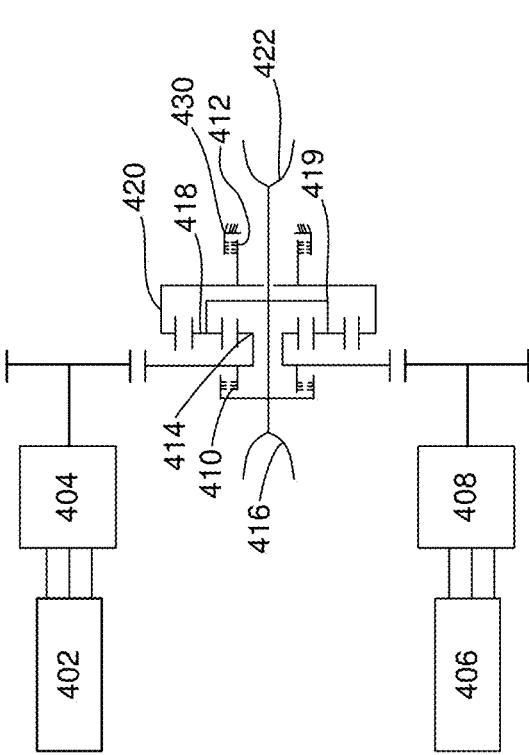
FIG. 4

1200

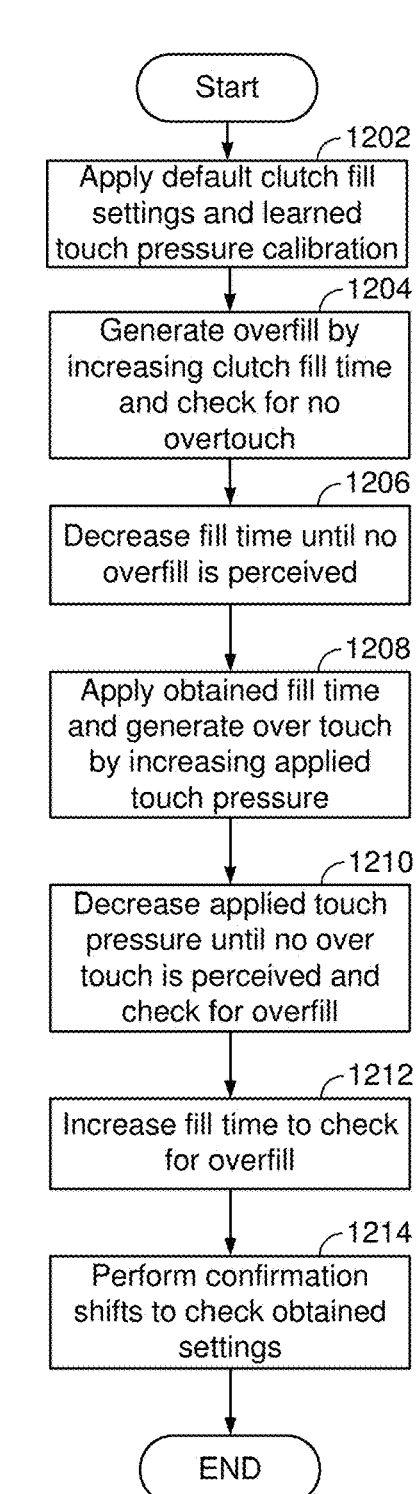

Start

1202
Apply default clutch fill settings and learned touch pressure calibration

1204
Generate overfill by increasing clutch fill time and check for no overtouch 1206
Decrease fill time until no overfill is perceived 1208
Apply obtained fill time and generate over touch by increasing applied touch pressure 1210
Decrease applied touch pressure until no over touch is perceived and check for overfill 1212
Increase fill time to check for overfill 1214
Perform confirmation shifts to check obtained settings

END

FIG. 12

SYSTEM AND METHOD FOR CALIBRATING TRANSMISSION

CROSS REFERENCE TO RELATED APPLICATION

The present application claims priority to U.S. Provisional Application No. 63/558,966, entitled "SYSTEM AND METHOD FOR CALIBRATING TRANSMISSION", and filed on Feb. 28, 2024. The entire contents of the above-listed application are hereby incorporated by reference for all purposes.

TECHNICAL FIELD

The present disclosure relates to automatically adjusting clutch control parameters for a transmission of a vehicle. The vehicle may include an electric propulsion source.

BACKGROUND AND SUMMARY

A transmission of a vehicle may include one or more clutches that allow different gears of the transmission to be engaged and disengaged. Operation of the clutches may be adjusted via a controller according to clutch control parameters. The clutch control parameters may be initially populated with default values that may be based on testing and/or simulations. However, there may be some part-to-part variability within the transmission that may result in the default control parameters being less effective than may be desired. Further, as the transmission ages and is subject to different applications, components within the transmission may wear such that the default control parameters may be less effective. For these reasons, it may be desirable for to adjust the initial or default control parameters so that transmission operation may be more repeatable as the transmission ages.

The inventors herein have recognized the above-mentioned issues and have developed a method for determining a clutch fill time, comprising: adjusting a valve to flow a fluid to a clutch; and adjusting the clutch fill time based on an amount of time between adjusting the valve and a torque output of an electric machine increasing by more than a threshold amount of torque to maintain speed of the electric machine.

By adjusting a valve to flow fluid to a clutch and adjusting a clutch fill time based on an amount of time between adjusting the valve and torque output of an electric machine increasing by more than a threshold amount, it may be possible to automatically (e.g., without human input) determine clutch control parameters. The clutch parameters may be determined when a transmission of the vehicle is engaged in park or neutral while a vehicle that includes the transmission is stationary. The approach may be performed at predetermined time or event intervals without a human request so that vehicle operation may not be interfered.

The present description may provide several advantages. In particular, the approach may reduce driveline torque disturbances by providing smoother gear shifts. Further, the approach may reduce a possibility of clutch wear. In addition, the approach may be performed automatically without interfering with vehicle operation.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to constrain the scope of the present disclosure in any way.

BRIEF DESCRIPTION OF THE FIGURES

FIGS. 2-4 show diagrams of example transmissions;

FIG. 12 shows a method for determining clutch control parameters.

DETAILED DESCRIPTION

Figure 1:
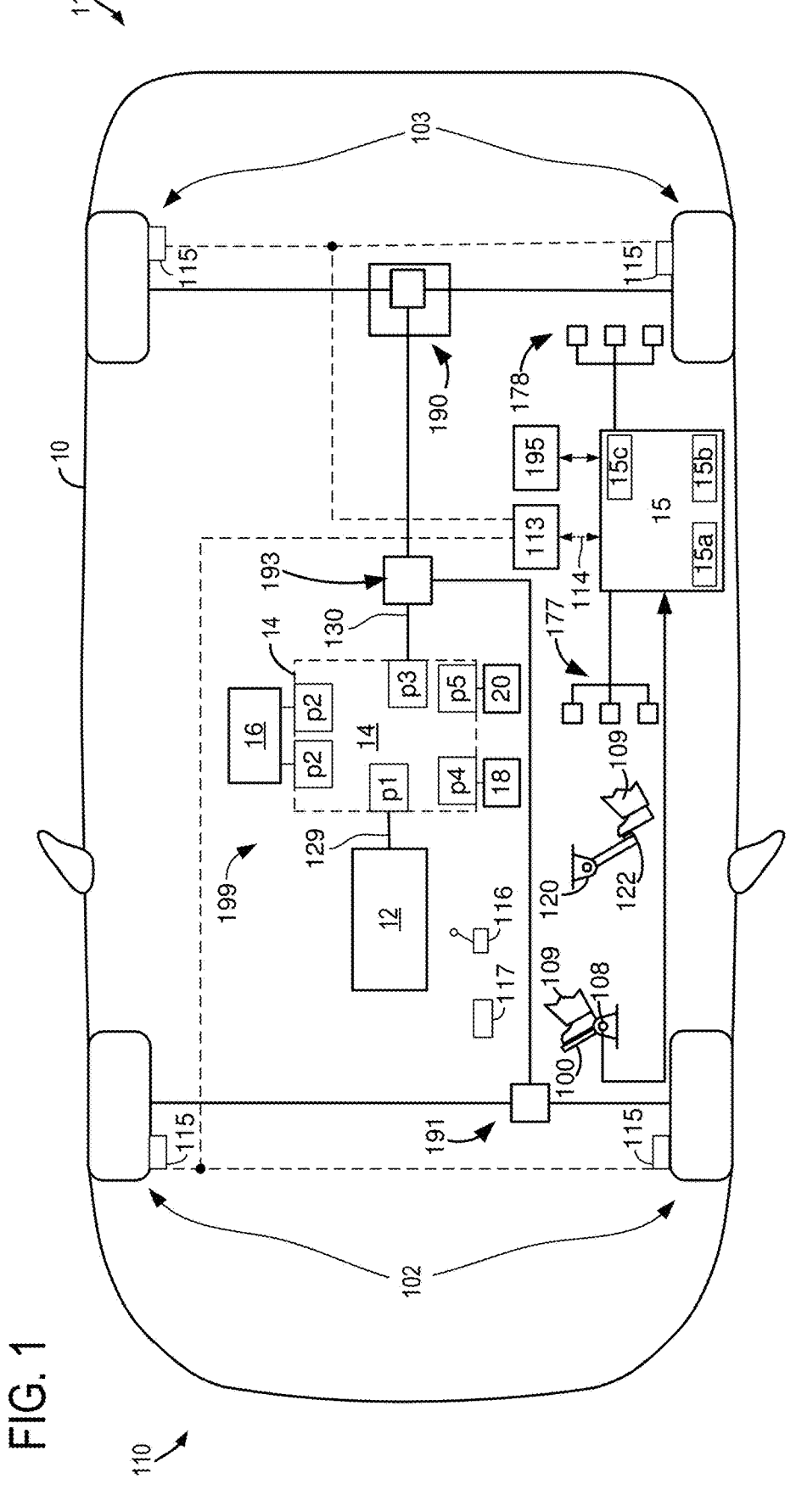
FIG. 1 is a schematic diagram of an example vehicle powertrain that includes a transmission.

The following description relates to systems and methods for automatically determining control parameters for a clutch. The control parameters include a clutch fill time (e.g., an amount of time that it takes for fluid to move clutch plates from a fully open clutch position to a position where the clutch's torque capacity begins to increase from zero or substantially zero (e.g., a value that is less than five percent of clutch torque capacity)) and a clutch touch pressure (e.g., a clutch pressure at which torque capacity of a clutch begins to increase from zero or substantially zero). The clutch torque capacity is an amount of torque that a clutch may transfer at the clutch's present operating state. The clutch control parameters may be applied to pre-position a clutch before torque is transferred via the clutch. The clutch may be actuated via a fluid that may be supplied to the clutch. In one example, the clutch may be included in a vehicle of the type that is shown in FIG. 1 or an alternative vehicle. The clutch may be incorporated in a transmission of the types shown in FIGS. 2-4. Alternatively, the clutch may be a driveline disconnect clutch that controls torque flow between a torque source and a remainder of a driveline. Clutch control parameters may be determined via operating sequences as shown in FIGS. 5-11. The clutch control parameters may be determined according to the method of FIG. 12.

FIG. 1 illustrates an example vehicle powertrain 199 included in vehicle 10. Vehicle 10 includes a front side 110 and a rear side 111. Vehicle 10 includes front wheels 102 and rear wheels 103. Vehicle 10 includes a torque source 12 (e.g., internal combustion engine or electric machine) that may selectively provide propulsive effort to front axle 191 and rear axle 190. In other examples, the torque source 12 may provide propulsive effort solely to front axle 191 or solely to rear axle 190. Torque source 12 is shown mechanically coupled to transmission 14 via transmission input shaft 129. In some examples, the engine's crankshaft (not shown) may be coupled to transmission input shaft 129. Transfer case 193 routes mechanical power from transmission output shaft 130 to front axle 191 and rear axle 190. A vehicle operator may select a particular transmission gear or vehicle operating mode via shifter 116. The vehicle's angle relative to horizontal ground may be determined via inclinometer 117.

Electric energy storage device 16 (e.g., a traction battery or capacitor) may provide electric power to electric machines included in transmission 14. Transmission 14 may supply mechanical power to mechanically driven accessories 18 and 20. Transmission 14 may be operated via controller 15. In this example, controller 15 is configured to command electric machines (not shown), clutches (not shown), and brakes (not shown) within transmission 14. Controller 15 may switch operating modes of transmission 14 via adjusting states of clutches and brakes. Controller 15 may also receive a position of a driver demand pedal 100 from driver demand pedal position sensor 108, which may be an input for determining the operating state of transmission 14. The driver demand pedal 100 and the driver demand pedal position sensor 108 may react to movement caused by human driver 109. Caliper control pedal 122 may be applied by human driver 109 and caliper pedal sensor 120 provides an indication of caliper pedal position to controller 15. Controller 15 may receive data from sensors 177. Sensors 177 may include, but are not constrained to a vehicle speed sensor, a transmission temperature sensor, transmission input shaft speed sensor, transmission output shaft speed sensor, wheel speed sensors, an inclinometer, and a shifter position sensor, and an ambient temperature sensor. Controller 15 may adjust operating states of the vehicle powertrain 199 via adjusting operating states of actuators 178. Actuators 178 may include but are not constrained to electric machines, inverters, clutch actuator valves for controlling fluid flow to clutches (C0-C2), valve actuators for controlling fluid flow to brakes (mid brake B1/low brake B2), electric machines, and engine torque actuators (throttle, cams, fuel injectors, spark actuator). Controller 15 includes a processor 15a for executing instructions, read-exclusive memory 15b, and random access memory 15c. In this example, a single controller 15 is shown, but in other examples several controllers may operate together in a distributed system to perform the methods described herein. Controller 15 may receive input from and provide output to human/machine interface 195 (e.g., touch screen display, pushbuttons, etc.). Controller 15 may also communicate with vehicle caliper controller 113 via controller area network 114. Vehicle caliper controller 113 may selectively apply and release friction brakes 115 in coordination with instructions received from controller 15. Alternatively, additional or fewer controllers may be provided. Transmission ports are indicated as P1-P5.

Figure 2:
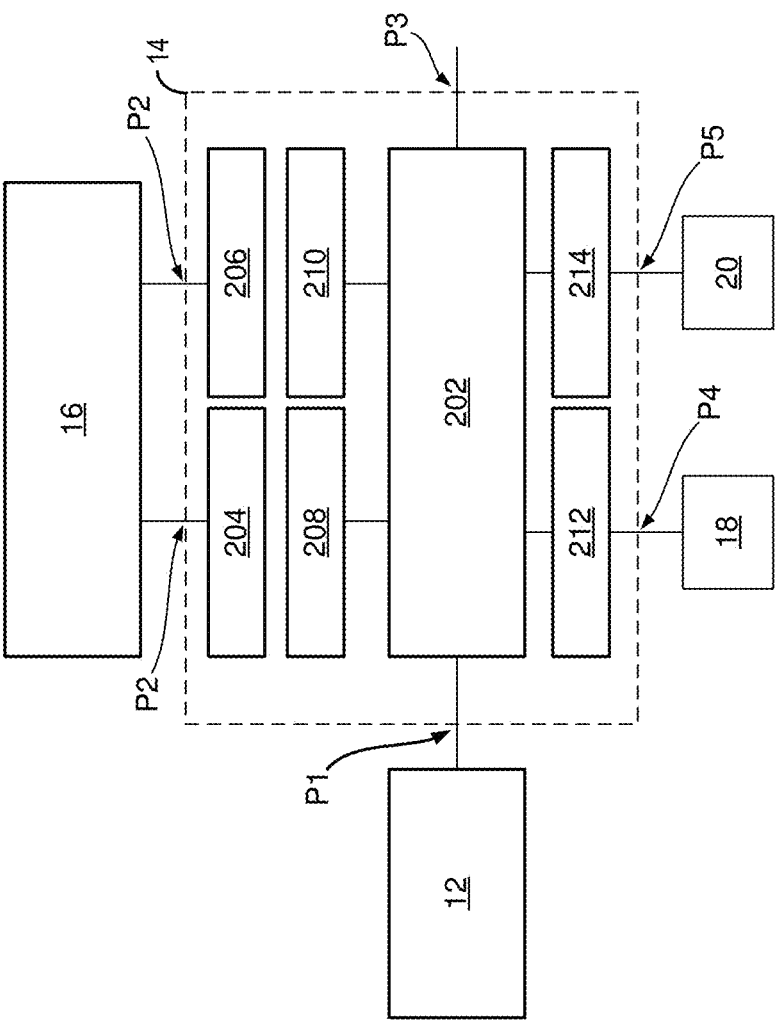

Referring now to FIG. 2, a block diagram of transmission 14 is shown. Transmission port 1 (P1) is configured to receive mechanical energy from torque source 12 (e.g., internal combustion engine or electric machine). Alternatively, port 1 may deliver mechanical energy to external power source 12. Port 2 (P2) is a port that receives electrical power from electric energy storage device 16. Alternatively, port 2 may provide electrical power to electric energy storage device 1. Electrical ports 2 are shown directly electrically coupled to a first inverter 206 and a second inverter 204. First inverter 206 may convert direct current (DC) to alternating current (AC). AC may be delivered from first inverter 206 to first electric machine 210. Likewise, AC may be delivered from second inverter 204 to second electric machine 208. Alternatively, first and second electric machines 210 and 208 may deliver AC power to inverters 206 and 204. Electric machines 210 and 208 may supply mechanical power to gears, clutches, and brakes 202. As such, electric machines 210 and 208 may also be referred to as torque sources. Gears, clutches, and brakes 202 may transfer mechanical power to output ports P3-P5. Output port P3 may transfer mechanical power to wheels 103. Output port P4 may transfer mechanical power to power take off (PTO1) 212 and accessories 18, the accessories 18 not including vehicle wheels. Output port P5 may transfer mechanical power to power take off (PTO2) 214 and accessories 20, the accessories 20 not including vehicle wheels.

Figure 3:
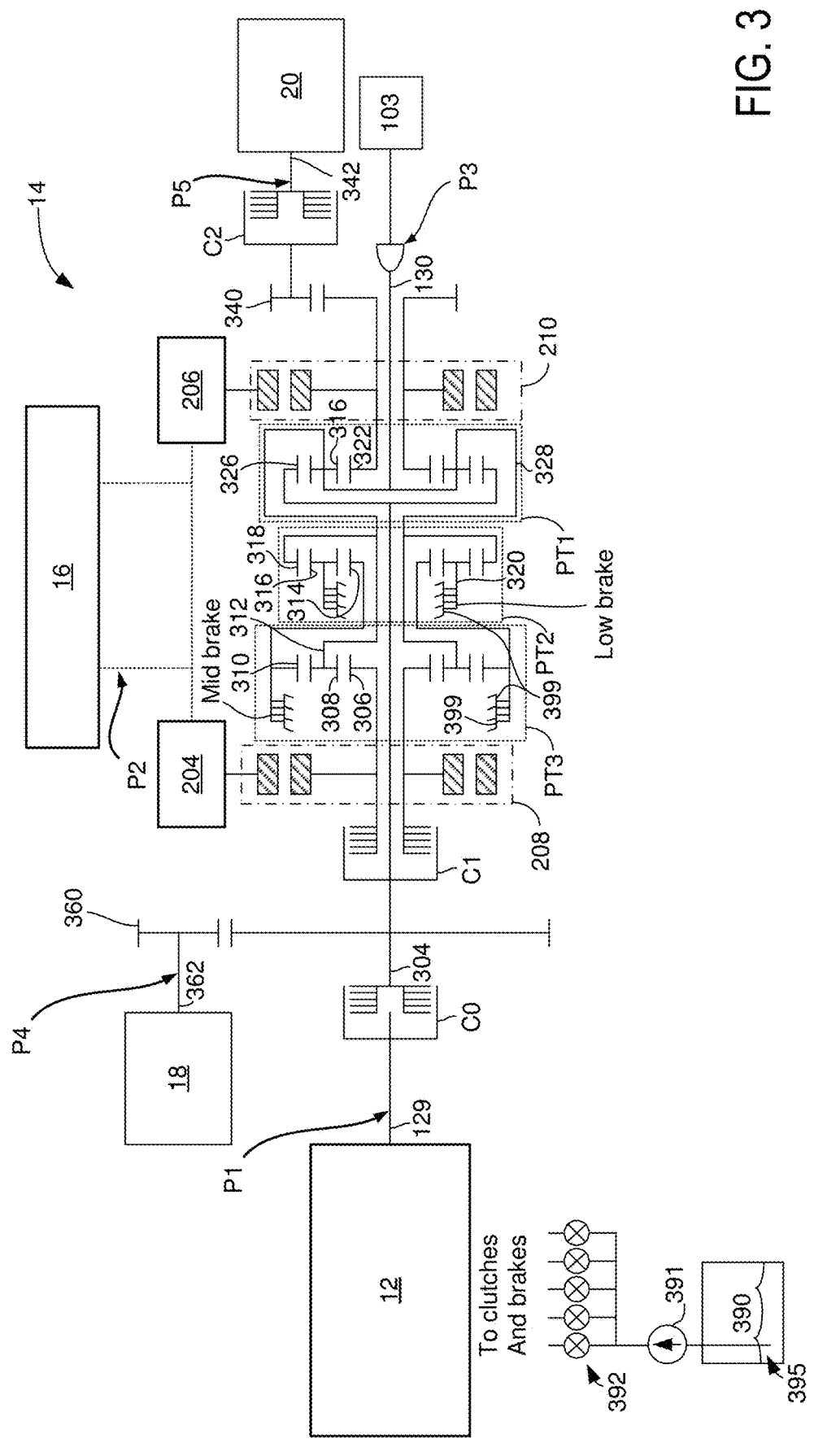

Turning now to FIG. 3, a detailed view of one example of transmission 14 is shown. In this example, torque source 12 is shown coupled to transmission input shaft 129. Transmission input shaft 129 is coupled to clutch C0 and clutch C0 may selectively couple transmission input shaft 129 to connecting shaft 304. Clutch C0 is directly coupled to ring gear 326 of first planetary gear set PT1 and PTO1 gear 360 via connecting shaft 304. PTO1 gear 360 may be coupled to accessories 18 via PTO1 shaft 362. First planetary gear set PT1 also includes planetary gears 316 and a sun gear 322. Sun gear 322 is shown coupled to PTO2 gear 340 and electric machine 210. Planetary gears 316 couple sun gear 322 to ring gear 326. Carrier 328 supports planetary gears 316. PTO2 gear 340 may be selectively coupled to PTO2 output shaft 342 via PTO2 clutch C2. PTO2 output shaft 342 may be directly coupled to accessories 20, and accessories 20 are not coupled to vehicle wheels.

Connecting shaft 304 may be selectively coupled to electric machine 208 and sun gear 306 of third planetary gear set PT3 via closing input coupled clutch C1. Sun gear 306 of third planetary gear set PT3 is coupled to planetary gears 308. Planetary gears 308 are coupled to ring gear 310, and planetary gears 308 are supported via carrier 312. Planetary gears 308 are coupled to ring gear 318 of second planetary gear set PT2 and planetary gears 316 of first planetary gear set PT1 via carrier 312 of third planetary gear set PT3 and carrier 328 of first planetary gear set PT1. Carrier 328 of first planetary gear set PT1 is coupled to wheels 103 via transmission output shaft 130. Mid brake B1 may be closed to ground or couple ring gear 310 of third planetary gear set PT3 to transmission case 399.

Second planetary gear set PT2 includes a sun gear 314 that is coupled to ring gear 310 of first planetary gear set PT1. Planetary gears 308 of second planetary gear set PT2 are coupled to sun gear 314 of planetary gear set PT2 and ring gear 318 of second planetary gear set PT2. Brake B2 may be closed to ground or couple carrier 320 of second planetary gear set PT2 to transmission case 399.

PTO1 is directly coupled to connecting shaft 304. Therefore, whenever connecting shaft 304 is rotating, PTO1 output shaft 362 rotates. PTO1 output shaft 362 may be rotated via closing clutch C0 when torque source 12 is rotating. PTO1 may also be rotated via electric machine 208 by closing clutch C1. PTO1 may rotate in any of the modes that are shown in the table of FIG. 4.

PTO2 may rotate and provide mechanical power to accessories 20 during three modes. In a hill hold mode, brakes mid brake B1 and low brake B2 may be closed to lock rotation of transmission output shaft 130 and PTO2 output shaft 342 may be rotated via torque generated via electric machine 210 and/or torque source 12. In this way, PTO2 output shaft 342 may rotate at a speed that is a multiple of a rotational speed of torque source 12 and connecting shaft 304.

PTO2 output shaft 342 may be rotated when clutch C1 is open, C2 is closed, and C0 is open or closed. PTO2 output shaft 342 may also provide mechanical torque to accessories 20 when brake mid brake B1 is open, low brake B2 is closed, C1 is open, C2 is closed and C0 is open or closed. Applying brake B2 prevents rotation of carrier 320 so that when torque source 12 or electric machine 208 drive the transmission output shaft 130 via connecting shaft 304, second planetary gear set PT2, and first planetary gear set PT1, PTO2 gear 340 may rotate. Energy may flow from torque source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO2 gear 340 to rotate. PTO2 output shaft 342 may rotate when clutch C2 is closed.

PTO2 output shaft 342 may also be rotated when clutch C1 is open, C2 is closed, and C0 is open or closed. PTO2 output shaft 342 may also provide mechanical torque to accessories 20 when brake mid brake B1 is closed, low brake B2 is open, C1 is open, C2 is closed and C0 is open or closed. Applying brake mid brake B1 prevents rotation of ring gear 310 and sun gear 306. Energy may flow from torque source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO2 gear 340 to rotate. PTO2 output shaft 342 may rotate when clutch C2 is closed.

Clutches and brakes of transmission 14 may be supplied with fluid 395 that is supplied by pump 391 from reservoir 390 by way of valves 392. A position of valves 392 and may be controlled via actuators 178 (e.g., valve actuators) to control flow of fluid to valves 392, clutches (C0-C2), and brakes.

Referring now to FIG. 4, one of several alternative transmission configurations that may benefit from the method disclosed herein is shown. Transmission 400 includes a first inverter 402 and a second inverter 406. First inverter 402 is directly electrically coupled to first electric machine 404. Second inverter 406 is directly electrically coupled to second electric machine 408. First electric machine 404 and second electric machine 408 may be powered by electric energy storage device 16 as shown in FIG. 1. In this example, controller 15 (e.g., as shown in FIG. 1) is configured to command first electric machine 404, second electric machine 408, a first clutch 410, and a first brake 412. The controller may switch operating modes of transmission 400 via adjusting states of clutches and brakes.

Transmission 400 includes a rear output shaft 416 and a front output shaft 422. Transmission also includes a planetary gear set 413 that includes a sun gear 414, planetary gears 418, carrier 419 that supports the planetary gears, and ring gear 420. First brake 412 may selectively couple ring gear 420 to transmission case 430. Rear output shaft 416 and front output shaft 422 are coupled to carrier 419 and first clutch 410. First clutch 410 may be closed to couple rear output shaft 416 and front output shaft 422 to sun gear 414, first electric machine 404 and second electric machine 408.

Figures 7, 8:
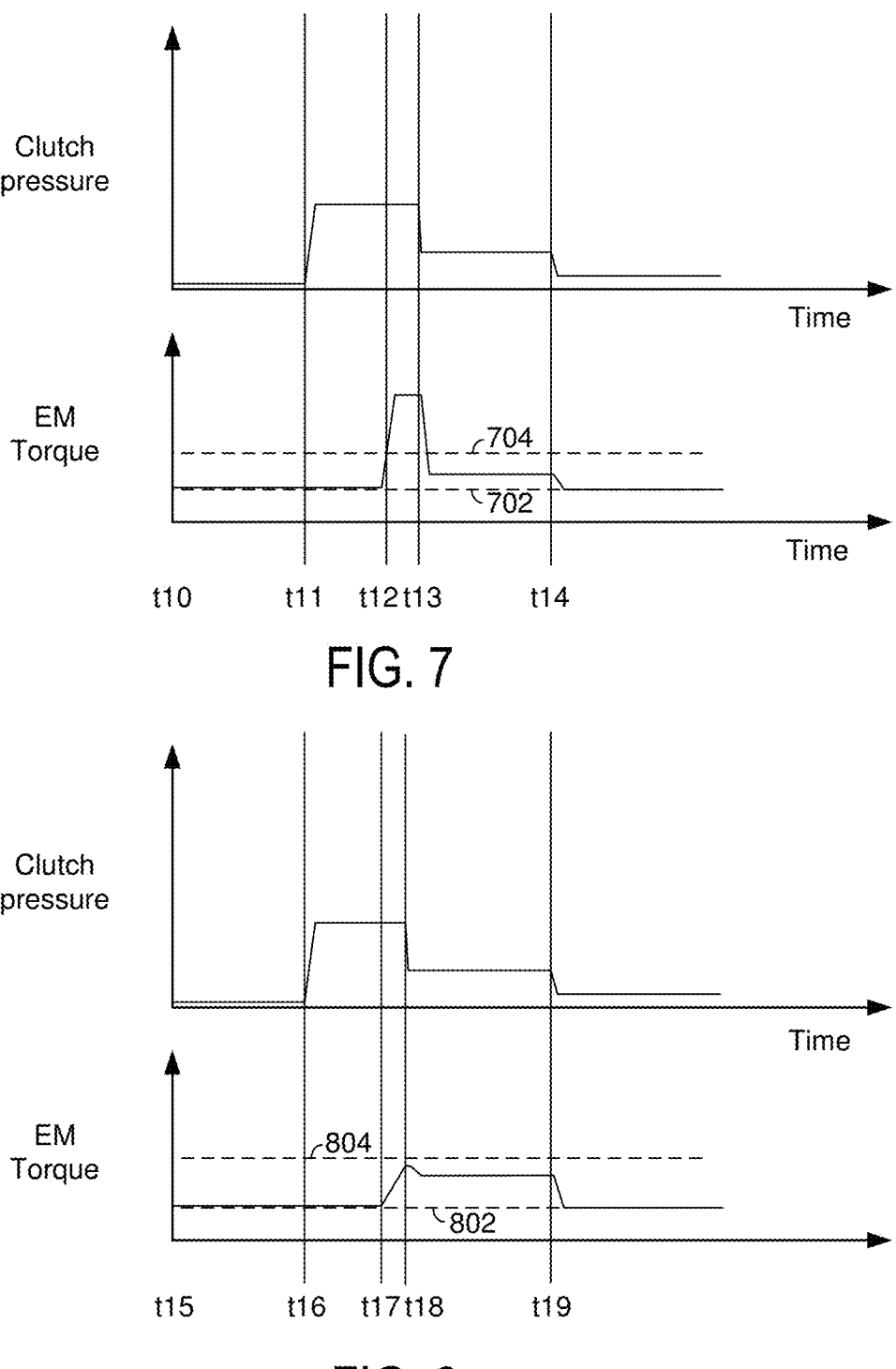

It may be appreciated that the transmissions of FIGS. 2-4 represent a mere fraction of transmissions in which the method of FIG. 7 may be applied. Further, the transmissions may be coupled to and/or include a variety of possible power sources.

Thus the systems of FIGS. 1-4 may provide for a vehicle system, comprising: one or more torque sources; a transmission including a plurality of clutches and gears; a controller including executable instructions that cause the controller to operate one of the one or more torque sources in a speed control mode and perform an automatic clutch parameter determination sequence that generates a clutch fill time and a clutch touch pressure according to output torque of one of the one or more torque sources. In a first example, the vehicle system further comprises additional instructions that cause the controller to increase a pressure in one of the plurality of clutches to a fill pressure while operating the one of the one or more torque sources in the speed control mode. In a second example that may include the first example, the vehicle system further comprises additional instructions that cause the controller to decrease the pressure in one of the plurality of clutches such that torque output of the one of the one or more torque sources is greater than a drag torque and less than a touch torque. In a third example that may include one or both of the first and second examples, the vehicle system further comprises additional instructions that cause the controller to decrease the pressure in one of the plurality of clutches to substantially zero pressure (e.g., less than 0.36 bar) a predetermined amount of time since the pressure in the one of the plurality of clutches caused torque output of the one or more torque sources to be greater than the drag torque and less than the touch torque. In a fourth example that may include one or more of the first through third examples, the vehicle system further comprises additional instructions that cause the controller to increase a pressure in one of the plurality of clutches to a fill pressure while operating the one of the one or more torque sources in the speed control mode and increase an amount of time the fill pressure is applied to the one of the plurality of clutches in response to electric machine torque being less than a touch torque. In a fifth example that may include one or more of the first through fourth examples, the vehicle system further comprises additional instructions that cause the controller to increase a pressure in one of the plurality of clutches to a fill pressure while operating the one of the one or more torque sources in the speed control mode and decrease an amount of time the fill pressure is applied to the one of the plurality of clutches in response to electric machine torque being greater than a touch torque. In a sixth example that may include one or more of the first through fifth examples, the vehicle system further comprises additional instructions that cause the controller to increase or decrease a pressure in one of the plurality of clutches after reducing the pressure in the one of the plurality of clutches from a fill pressure during the automatic clutch parameter determination sequence in response to electric machine torque.

Figures 5, 6:
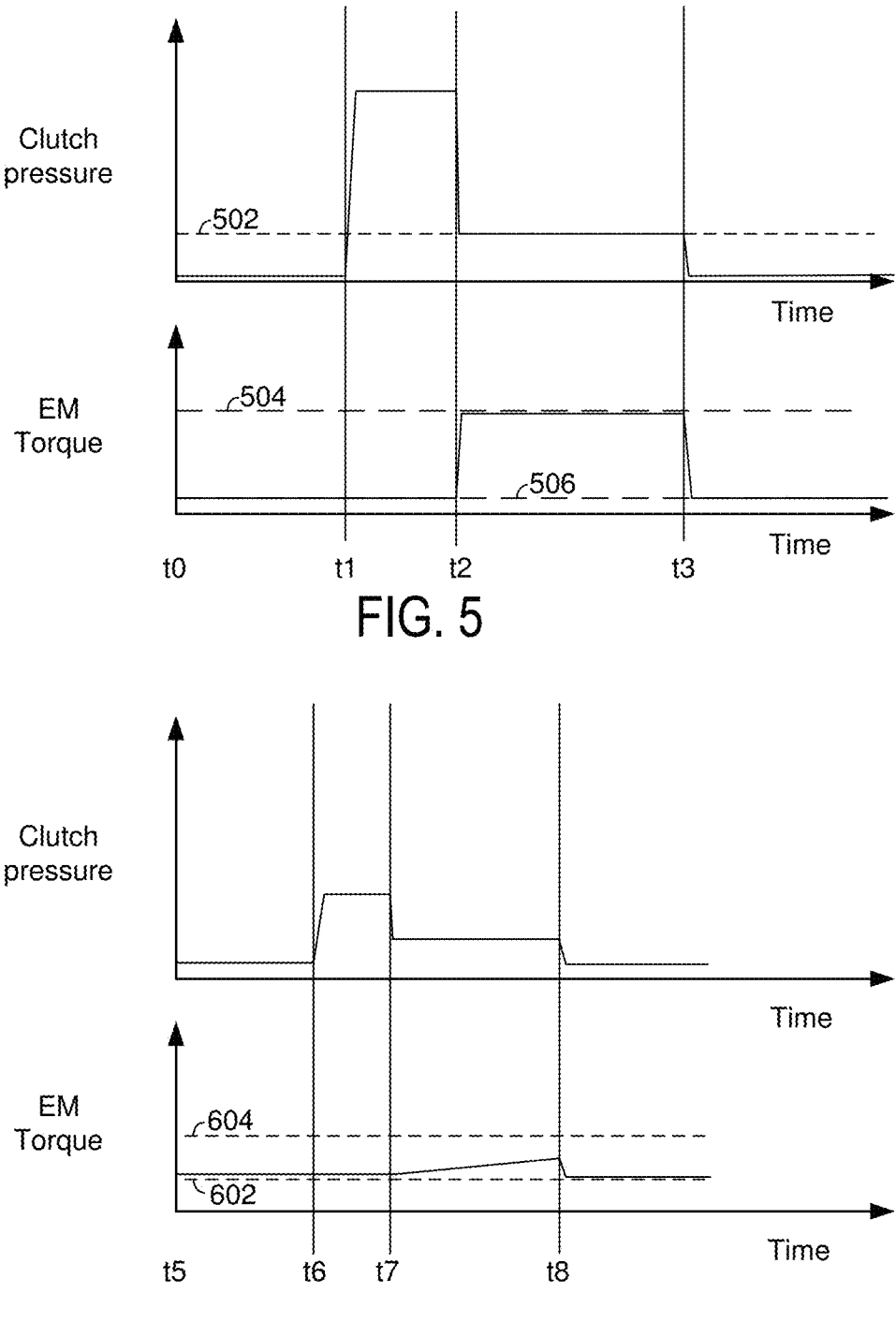
FIG. 5 shows example phases of a desired sequence for determining clutch control parameters.
FIGS. 6-9 show example clutch pressures and electric machine torques when determining clutch fill time.

Referring now to FIG. 5, example phases of a desired sequence for determining control parameters of a clutch are shown. The sequence of FIG. 5 may be provided via the method of FIG. 13 in cooperation with the system of FIGS. 1-4. The plots of FIG. 5 are time aligned.

The first plot from the top of FIG. 5 is a plot of pressure that is applied to a clutch, or clutch pressure, versus time. The vertical axis represents clutch pressure and clutch pressures increases from zero at the level of the horizontal axis in the direction of the vertical axis arrow. The horizontal axis represents time and time increases from the left side of the plot to the right side of the plot. Horizontal line 502 represents a "touch pressure" or a "clutch touch pressure," which is a pressure that is applied by a fluid within the clutch and that causes the clutch to overcome clutch backpressure to compress clutch plates and friction plates within the clutch such that the clutch begins to transition from not having torque capacity to transfer torque to beginning to have torque capacity to transfer torque.

The second plot from the top of FIG. 5 is a plot of electric machine torque output versus time. The vertical axis represents electric machine torque output and electric machine torque output increases from zero at the level of the horizontal axis in the direction of the vertical axis arrow. The horizontal axis represents time and time increases from the left side of the plot to the right side of the plot. Horizontal line 504 represents a "touch torque," which is a torque that is generated by an electric machine to rotate the clutch at a predetermined speed when pressure within the clutch is at the touch pressure and components within the clutch are at a position where the clutch's torque capacity begins to increase. Horizontal line 502 represents a "drag torque," which is a minimum torque that is generated by an electric machine to rotate the clutch at a predetermined speed when the clutch is fully open and the torque transfer capacity of the clutch is zero.

At time t0, the first phase of the sequence for determining clutch control parameters begins. In the first phase, an electric machine that rotates the clutch is operated in a speed control mode where the electric machine is rotated at a predetermined speed. The torque of the electric machine may be varied while the electric machine operates in speed control mode so that speed of the electric machine follows a desired or requested electric machine speed. Conversely, torque of the electric machine is adjusted to follow a requested or desired torque and electric machine speed is allowed to vary when the electric machine is operated in a torque control mode. Operating the electric machine in the speed control mode may allow clutch control parameters to be determined in a repeatable way so that clutch operation may be more repeatable. The clutch pressure is zero or substantially zero (e.g., less than 0.36 bar) and torque of the electric machine is at the level of drag torque that rotates one portion of the clutch at a predetermined speed. The torque output of the electric machine is a drag level torque since the clutch is fully open.

At time t1, the second phase of the sequence for determining clutch control parameters begins. In the second phase, clutch pressure is increased to a fill pressure that is above the touch pressure to begin compressing clutch plates and friction plates. The electric machine remains in speed control mode while the clutch pressure is increased. The pressure increase at time t1 increases the rate that the clutch plates move toward a position where the clutch torque capacity begins to increase.

At time t2, the third phase of the sequence for determining clutch control parameters begins. In the third phase, the clutch pressure is reduced down to a touch pressure so that the clutch does not close prematurely. Shortly after time t2, the electric machine torque increases toward the touch torque as the clutch torque capacity begins to increase. The speed of the electric machine (not shown) remains at the predetermined speed.

At time t3, the fourth phase of the sequence for determining clutch control parameters begins. In the fourth phase, the clutch pressure is reduced to near zero so the electric machine torque may be reduced to the drag torque level.

During these phases, clutch control parameters may be determined as described subsequently in further detail. The sequence of FIG. 5 may be performed during predetermined conditions so that vehicle operation may not be disturbed. For example, the sequence of FIG. 5 may be performed when the transmission is engaged in park or neutral when the vehicle that includes the transmission is stationary.

Referring now to FIG. 6, an example sequence for determining a clutch fill time for a clutch is shown. In this example, the time allocated to fill the clutch with fluid so that the electric machine achieves the touch torque is shorter than the actual fill time for the clutch so the electric machine torque does not reach the touch torque. When the conditions shown in FIG. 6 are determined, the amount of time that the clutch is allocated to fill may be increased so that the actual fill time may be determined. The sequence of FIG. 6 may be provided via the method of FIG. 13 in cooperation with the system of FIGS. 1-4. The plots of FIG. 6 are time aligned.

The first plot from the top of FIG. 6 is a plot of pressure that is applied to a clutch, or clutch pressure, versus time. The vertical axis represents rotational clutch pressure and clutch pressures increases from zero at the level of the horizontal axis in the direction of the vertical axis arrow. The horizontal axis represents time and time increases from the left side of the plot to the right side of the plot.

The second plot from the top of FIG. 6 is a plot of electric machine torque output versus time. The vertical axis represents electric machine torque output and electric machine torque output increases from zero at the level of the horizontal axis in the direction of the vertical axis arrow. The horizontal axis represents time and time increases from the left side of the plot to the right side of the plot. Horizontal line 604 represents a "touch torque," which is a torque that is generated by an electric machine to rotate the clutch at a predetermined speed when pressure within the clutch is at the touch pressure and the components within the clutch are at a position where the clutch's torque capacity begins to increase. Horizontal line 602 represents a "drag torque," which is a minimum torque that is generated by an electric machine to rotate the clutch at a predetermined speed when the clutch is fully open and the torque transfer capacity of the clutch is zero.

At time t5, the first phase of the sequence for determining clutch control parameters begins. In the first phase, an electric machine that rotates the clutch is operated in a speed control mode where the electric machine is rotated at a predetermined speed. The clutch pressure is zero or substantially zero (e.g., less than 0.36 bar) and torque of the electric machine is at the level of drag torque that rotates one portion of the clutch at a predetermined speed. The torque output of the electric machine is a drag level torque since the clutch is fully open.

At time t6, the second phase of the sequence for determining clutch control parameters begins. In the second phase, clutch pressure is increased to a fill pressure that is above the touch pressure to begin compressing clutch plates and friction plates. The electric machine remains in speed control mode while the clutch pressure is increased. The pressure increase at time t6 increases the rate that the clutch plates move toward a position where the clutch torque capacity begins to increase.

At time t7, the third phase of the sequence for determining clutch control parameters begins, but in this example, the third phase begins before the electric machine torque has reached the touch torque. Consequently, the time amount of the time between t6 and t7, which is the basis for determining the fill time is too short to be the fill time. Therefore, the fill time will be increased in a next iteration. The speed of the electric machine (not shown) remains at the predetermined speed.

At time t8, the fourth phase of the sequence for determining clutch control parameters begins. In the fourth phase, the clutch pressure is reduced to near zero so the electric machine torque may be reduced to the drag torque level. The electric machine torque has not achieved the touch torque in this example, so an accurate clutch fill time cannot be delivered to the system for clutch control.

Like the sequence of FIG. 5, the sequence of FIG. 6 may be performed during predetermined conditions so that vehicle operation may not be disturbed. For example, the sequence of FIG. 6 may be performed when the transmission is engaged in park or neutral when the vehicle that includes the transmission is stationary.

Referring now to FIG. 7, an example sequence for determining a clutch fill time for a clutch is shown. In this example, the time allocated to fill the clutch with fluid so that the electric machine achieves the touch torque is longer than the actual fill time for the clutch so the electric machine torque exceeds the touch torque. When the conditions shown in FIG. 7 are determined, the amount of time that the clutch is allocated to fill may be decreased so that the actual fill time may be determined. The sequence of FIG. 7 may be provided via the method of FIG. 13 in cooperation with the system of FIGS. 1-4. The plots of FIG. 7 are time aligned.

The first plot from the top of FIG. 7 is a plot of pressure that is applied to a clutch, or clutch pressure, versus time. The vertical axis represents rotational clutch pressure and clutch pressures increases from zero at the level of the horizontal axis in the direction of the vertical axis arrow. The horizontal axis represents time and time increases from the left side of the plot to the right side of the plot.

The second plot from the top of FIG. 7 is a plot of electric machine torque output versus time. The vertical axis represents electric machine torque output and electric machine torque output increases from zero at the level of the horizontal axis in the direction of the vertical axis arrow. The horizontal axis represents time and time increases from the left side of the plot to the right side of the plot. Horizontal line 704 represents a "touch torque," which is a torque that is generated by an electric machine to rotate the clutch at a predetermined speed when pressure within the clutch is at the touch pressure and the clutch is at a position where its torque capacity begins to increase. Horizontal line 702 represents a "drag torque," which is a minimum torque that is generated by an electric machine to rotate the clutch at a predetermined speed when the clutch is fully open and the torque transfer capacity of the clutch is zero.

At time t10, the first phase of the sequence for determining clutch control parameters begins. In the first phase, an electric machine that rotates the clutch is operated in a speed control mode where the electric machine is rotated at a predetermined speed. The clutch pressure is zero or substantially zero (e.g., less than 0.36 bar) and torque of the electric machine is at the level of drag torque that rotates one portion of the clutch at a predetermined speed. The torque output of the electric machine is a drag level torque since the clutch is fully open.

At time t11, the second phase of the sequence for determining clutch control parameters begins. In the second phase, clutch pressure is increased to a fill pressure that is above the touch pressure to begin compressing clutch plates and friction plates. The electric machine remains in speed control mode while the clutch pressure is increased. The pressure increase at time t11 increases the rate that the clutch plates move toward a position where the clutch torque capacity begins to increase.

At time t12, the electric machine torque exceeds the touch torque while the clutch pressure is commanded to a fill pressure before the clutch pressure is commanded to the touch pressure. This condition may be indicative or a clutch overfill condition for the clutch being commanded to a touch position. If the clutch is overfilled when the clutch is being prepositioned for application, an unintended and undesired torque bump may occur, resulting in undesired output torque bump, as well as clutch losses and wear may increase. Consequently, a clutch overfill condition may not be desirable. The electric machine remains in speed control at the requested speed and the clutch pressure is at the filling pressure that was commanded at time t11. Because the electric machine torque has exceeded the touch torque before the clutch pressure has been reduced to the touch pressure, an accurate touch time may not be determined without repeating the clutch fill time determination sequence.

At time t13, the third phase of the sequence for determining clutch control parameters begins, but in this example, the third phase begins after the electric machine torque has exceeded the touch torque. Consequently, the time amount of time between t11 and t13, which is the basis for determining the fill time is too long to be the fill time. As a result, instead of reducing the clutch pressure at a predetermined time and calling the predetermined time the clutch fill time, a more accurate estimate of the clutch fill time may be determined by shortening the amount of time that the clutch is allowed to fill and re-estimating the clutch fill time. The clutch fill time may be decreased in predetermined increments and the clutch fill time may be reevaluated each time the clutch fill time is reduced. Thus, for this example, time t13 would be retarded to the left of its present position before reassessing the clutch fill time. The clutch fill time may be determined as the time between time t11 and the time when electric machine torque is within a threshold torque of the touch torque before the clutch pressure is reduced to the touch pressure. The electric machine torque is reduced shortly after the clutch pressure is reduced toward the touch pressure. The speed of the electric machine (not shown) remains at the predetermined speed.

At time t14, the fourth phase of the sequence for determining clutch control parameters begins. In the fourth phase, the clutch pressure is reduced to near zero so the electric machine torque may be reduced to the drag torque level. The electric machine torque is slightly below the touch torque just before time t14.

Like the sequence of FIG. 5, the sequence of FIG. 7 may be performed during predetermined conditions so that vehicle operation may not be disturbed. For example, the sequence of FIG. 7 may be performed when the transmission is engaged in park or neutral when the vehicle that includes the transmission is stationary.

Referring now to FIG. 8, an example sequence for determining a clutch fill time for a clutch is shown. In this example, the time allocated to fill the clutch with fluid so that the electric machine achieves the touch torque provides an accurate estimate of the clutch fill time. When the conditions shown in FIG. 8 are determined, the amount of time that the clutch is allocated to fill may be output decreased so that the actual fill time may be determined. The sequence of FIG. 8 may be provided via the method of FIG. 13 in cooperation with the system of FIGS. 1-4. The plots of FIG. 8 are time aligned.

The first plot from the top of FIG. 8 is a plot of pressure that is applied to a clutch, or clutch pressure, versus time. The vertical axis represents rotational clutch pressure and clutch pressures increases from zero at the level of the horizontal axis in the direction of the vertical axis arrow. The horizontal axis represents time and time increases from the left side of the plot to the right side of the plot.

The second plot from the top of FIG. 8 is a plot of electric machine torque output versus time. The vertical axis represents electric machine torque output and electric machine torque output increases from zero at the level of the horizontal axis in the direction of the vertical axis arrow. The horizontal axis represents time and time increases from the left side of the plot to the right side of the plot. Horizontal line 804 represents a "touch torque," which is a torque that is generated by an electric machine to rotate the clutch at a predetermined speed when pressure within the clutch is at the touch pressure and the clutch is at a position where its torque capacity begins to increase. Horizontal line 802 represents a "drag torque," which is a minimum torque that is generated by an electric machine to rotate the clutch at a predetermined speed when the clutch is fully open and the torque transfer capacity of the clutch is zero.

At time t15, the first phase of the sequence for determining clutch control parameters begins. In the first phase, an electric machine that rotates the clutch is operated in a speed control mode where the electric machine is rotated at a predetermined speed. The clutch pressure is zero or substantially zero (e.g., less than 0.36 bar) and torque of the electric machine is at the level of drag torque that rotates one portion of the clutch at a predetermined speed. The torque output of the electric machine is a drag level torque since the clutch is fully open.

At time t16, the second phase of the sequence for determining clutch control parameters begins. In the second phase, clutch pressure is increased to a fill pressure that is above the touch pressure to begin compressing clutch plates and friction plates. The electric machine remains in speed control mode while the clutch pressure is increased. The pressure increase at time t16 increases the rate that the clutch plates move toward a position where the clutch torque capacity begins to increase.

At time t17, the electric machine torque begins to increase while the clutch pressure is commanded to a fill pressure before the clutch pressure is commanded to the touch pressure. However, the electric machine torque does not exceed the touch torque. The electric machine remains in speed control at the requested speed and the clutch pressure is at the filling pressure that was commanded at time t16.

At time t18, the third phase of the sequence for determining clutch control parameters begins, but in this example, the third phase begins before the electric machine torque has exceeded the touch torque. As a result, the time amount of time between t16 and t17, may be determined to be the clutch fill time. The clutch fill time may be supplied to the system so that the clutch may be controlled in a way that may be desired. The electric machine torque is reduced shortly after the clutch pressure is reduced toward the touch pressure. The speed of the electric machine (not shown) remains at the predetermined speed.

At time t19, the fourth phase of the sequence for determining clutch control parameters begins. In the fourth phase, the clutch pressure is reduced to near zero so the electric machine torque may be reduced to the drag torque level. The electric machine torque is slightly below the touch torque just before time t19.

Like the sequence of FIG. 5, the sequence of FIG. 8 may be performed during predetermined conditions so that vehicle operation may not be disturbed. For example, the sequence of FIG. 8 may be performed when the transmission is engaged in park or neutral when the vehicle that includes the transmission is stationary.

Figure 9:
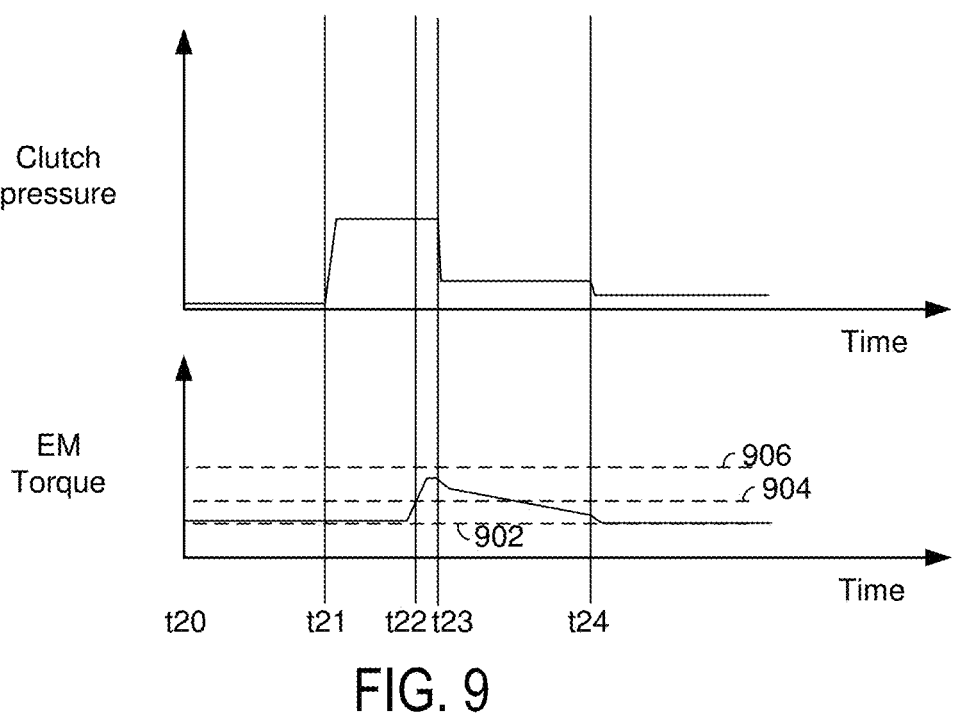

Referring now to FIG. 9, an example sequence for determining a clutch touch pressure and clutch touch position. In this example, the pressure that is believed to be the clutch touch pressure is lower than the actual clutch touch pressure. When the conditions shown in FIG. 9 are determined, the clutch touch pressure may be increased and the clutch touch pressure determination sequence may be repeated to determine if the clutch touch pressure is an actual clutch pressure. The sequence of FIG. 9 may be provided via the method of FIG. 13 in cooperation with the system of FIGS. 1-4. The plots of FIG. 9 are time aligned.

The first plot from the top of FIG. 9 is a plot of pressure that is applied to a clutch, or clutch pressure, versus time. The vertical axis represents rotational clutch pressure and clutch pressures increases from zero at the level of the horizontal axis in the direction of the vertical axis arrow. The horizontal axis represents time and time increases from the left side of the plot to the right side of the plot.

The second plot from the top of FIG. 9 is a plot of electric machine torque output versus time. The vertical axis represents electric machine torque output and electric machine torque output increases from zero at the level of the horizontal axis in the direction of the vertical axis arrow. The horizontal axis represents time and time increases from the left side of the plot to the right side of the plot. Horizontal line 906 represents a "maximum touch torque," which is a torque that is generated by an electric machine to rotate the clutch at a predetermined speed when pressure within the clutch is within a first predetermined range of a touch pressure. Horizontal line 904 represents a "minimum touch torque," which is a torque that is generated by an electric machine to rotate the clutch at a predetermined speed when pressure within the clutch is within a second predetermined range of a touch pressure. Horizontal line 902 represents a "drag torque," which is a minimum torque that is generated by an electric machine to rotate the clutch at a predetermined speed when the clutch is fully open and the torque transfer capacity of the clutch is zero.

At time t20, the first phase of the sequence for determining a clutch touch pressure begins. In the first phase, an electric machine that rotates the clutch is operated in a speed control mode where the electric machine is rotated at a predetermined speed. The clutch pressure is zero or substantially zero (e.g., less than 0.36 bar) and torque of the electric machine is at the level of drag torque that rotates one portion of the clutch at a predetermined speed. The torque output of the electric machine is a drag level torque since the clutch is fully open.

At time t21, the second phase of the sequence for determining the clutch touch pressure begins. In the second phase, clutch pressure is increased to a fill pressure that is above the touch pressure to begin compressing clutch plates and friction plates. The electric machine remains in speed control mode while the clutch pressure is increased. The pressure increase at time t21 increases the rate that the clutch plates move toward a position where the clutch torque capacity begins to increase.

At time t22, the clutch pressure is at the fill pressure and the electric machine torque has increased above the minimum touch torque. The electric machine speed (not shown) remains at its requested speed.

At time t23, the third phase of the sequence for determining clutch touch pressure begins. In this example, the third phase begins with the electric machine torque being within a touch torque range (e.g., between the minimum and maximum touch torques). The third phase begins with the clutch pressure being reduced to a value of a current clutch touch pressure. The electric machine torque begins to decline shortly after time t23 in response to the reduction in the clutch pressure, but the electric machine speed (not shown) is unchanged. However, before time t24 is reached, the electric machine torque falls below the minimum touch torque. This may be an indication that the present clutch touch pressure estimate is too low. A touch pressure that is too low may result in reduced clutch torque control. The clutch may drain and the clutch plates may separate. The clutch may not be ready to provide torque, and on a torque request (pressure request), instead of increasing its torque capacity, it may re-fill. While re-filling the clutch may not provide any torque capacity. Until the clutch is filled again, when usually, because of the non-zero clutch torque (and pressure) request, the clutch may experience a pressure and torque bump, which will be propagated as an undesirable vehicle output torque-Therefore, the present clutch touch pressure may be incremented and the clutch touch pressure determining sequence may be repeated.

At time t24, the fourth phase of the sequence for determining clutch touch pressure begins. In the fourth phase, the clutch pressure is reduced to near zero so the electric machine torque may be reduced to the drag torque level. The electric machine torque has not achieved the touch torque in this example, so an accurate clutch touch pressure cannot be delivered to the system for clutch control.

Like the sequence of FIG. 5, the sequence of FIG. 9 may be performed during predetermined conditions so that vehicle operation may not be disturbed. For example, the sequence of FIG. 9 may be performed when the transmission is engaged in park or neutral when the vehicle that includes the transmission is stationary.

Figure 10:
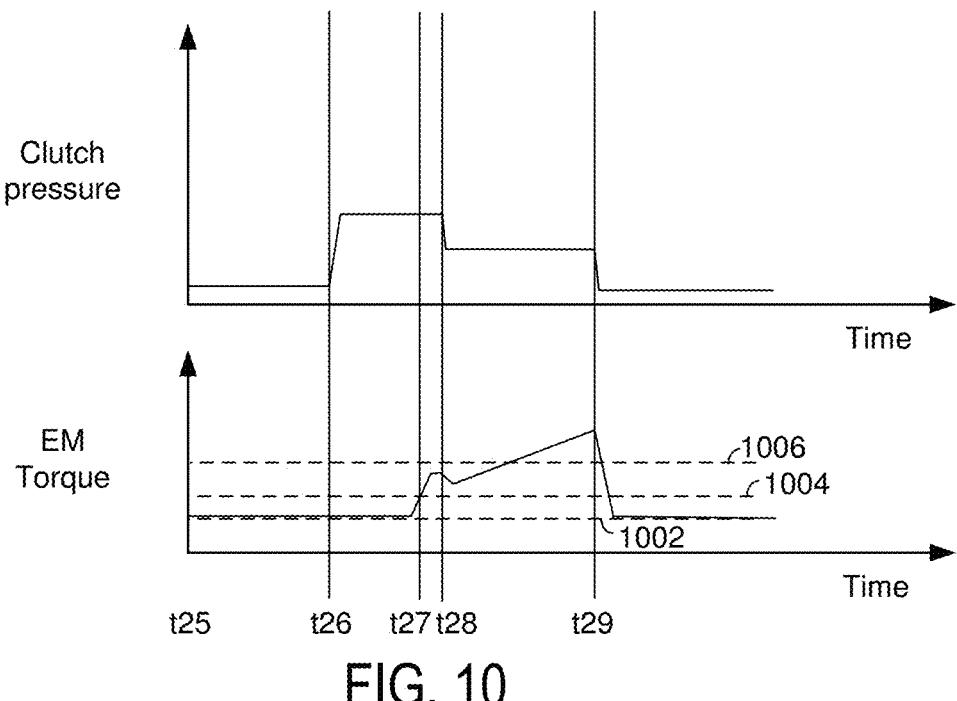
FIGS. 10-11 show example clutch pressures and electric machine torques when determining clutch touch pressure.

Referring now to FIG. 10, an example sequence for determining a touch pressure and touch position (e.g., a clutch pressure amount at which the clutch begins to increase from zero clutch torque capacity to a non-zero clutch torque capacity). In this example, the pressure that is believed to be the clutch touch pressure is higher than the actual touch pressure. When the conditions shown in FIG. 10 are determined, the clutch touch pressure may be decreased and the touch pressure determination sequence may be repeated to determine if the clutch touch pressure is an actual clutch pressure. The sequence of FIG. 10 may be provided via the method of FIG. 13 in cooperation with the system of FIGS. 1-4. The plots of FIG. 10 are time aligned.

The first plot from the top of FIG. 10 is a plot of pressure that is applied to a clutch, or clutch pressure, versus time. The vertical axis represents rotational clutch pressure and clutch pressures increases from zero at the level of the horizontal axis in the direction of the vertical axis arrow. The horizontal axis represents time and time increases from the left side of the plot to the right side of the plot.

The second plot from the top of FIG. 10 is a plot of electric machine torque output versus time. The vertical axis represents electric machine torque output and electric machine torque output increases from zero at the level of the horizontal axis in the direction of the vertical axis arrow. The horizontal axis represents time and time increases from the left side of the plot to the right side of the plot. Horizontal line 1006 represents a "maximum touch torque," which is a torque that is generated by an electric machine to rotate the clutch at a predetermined speed when pressure within the clutch is within a first predetermined range of a touch pressure. Horizontal line 1004 represents a "minimum touch torque," which is a torque that is generated by an electric machine to rotate the clutch at a predetermined speed when pressure within the clutch is within a second predetermined range of a touch pressure. Horizontal line 1002 represents a "drag torque," which is a minimum torque that is generated by an electric machine to rotate the clutch at a predetermined speed when the clutch is fully open and the torque transfer capacity of the clutch is zero.

At time t25, the first phase of the sequence for determining a clutch touch pressure begins. In the first phase, an electric machine that rotates the clutch is operated in a speed control mode where the electric machine is rotated at a predetermined speed. The clutch pressure is zero or substantially zero (e.g., less than 0.36 bar) and torque of the electric machine is at the level of drag torque that rotates one portion of the clutch at a predetermined speed. The torque output of the electric machine is a drag level torque since the clutch is fully open.

At time t26, the second phase of the sequence for determining the clutch touch pressure begins. In the second phase, clutch pressure is increased to a fill pressure that is above the touch pressure to begin compressing clutch plates and friction plates. The electric machine remains in speed control mode while the clutch pressure is increased. The pressure increase at time t26 increases the rate that the clutch plates move toward a position where the clutch torque capacity begins to increase.

At time t27, the clutch pressure is at the fill pressure and the electric machine torque has increased above the minimum touch torque. The electric machine speed (not shown) remains at its requested speed.

At time t28, the third phase of the sequence for determining clutch touch pressure begins. In this example, the third phase begins with the electric machine torque being within a touch torque range (e.g., between the minimum and maximum touch torques). The third phase begins with the clutch pressure being reduced to a value of a current clutch touch pressure. The electric machine torque begins to decline shortly after time t28 in response to the reduction in the clutch pressure, but the electric machine speed (not shown) is unchanged. However, before time t29 is reached, the electric machine torque is above the maximum touch torque. This may be an indication that the present clutch touch pressure estimate is too high. A touch pressure which is too high may induce unintended clutch torques, which may degrade vehicle drivability. Further, a touch pressure that is too high may increase powertrain losses. Therefore, the present clutch touch pressure may be decremented and the clutch touch pressure determining sequence may be repeated.

At time t29, the fourth phase of the sequence for determining clutch touch pressure begins. In the fourth phase, the clutch pressure is reduced to near zero so the electric machine torque may be reduced to the drag torque level. The electric machine torque has exceeded the touch torque in this example, so an accurate clutch touch pressure cannot be delivered to the system for clutch control.

Like the sequence of FIG. 5, the sequence of FIG. 10 may be performed during predetermined conditions so that vehicle operation may not be disturbed. For example, the sequence of FIG. 10 may be performed when the transmission is engaged in park or neutral when the vehicle that includes the transmission is stationary.

Figure 11:
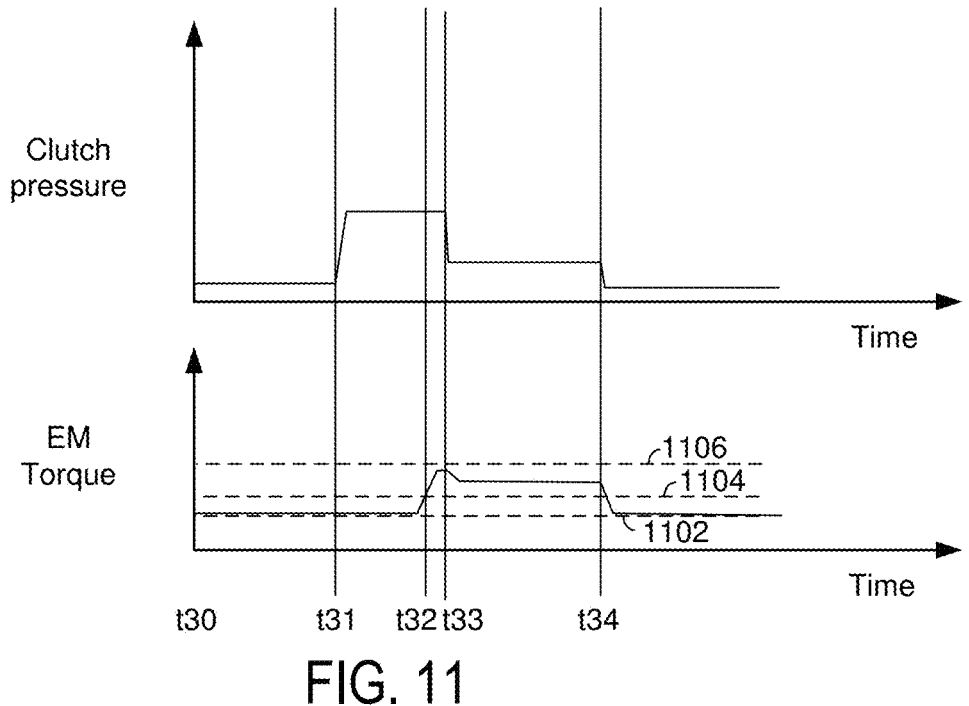

Moving on to FIG. 11, an example sequence for determining a touch pressure and touch position (e.g., a clutch pressure amount at which the clutch begins to increase from zero clutch torque capacity to a non-zero clutch torque capacity). In this example, the pressure that is believed to be the clutch touch pressure is higher than the actual touch pressure. When the conditions shown in FIG. 11 are determined, the clutch touch pressure may be determined to be an actual touch pressure that may be applied by the system to operate and control the clutch. The sequence of FIG. 11 may be provided via the method of FIG. 13 in cooperation with the system of FIGS. 1-4. The plots of FIG. 11 are time aligned.

The first plot from the top of FIG. 11 is a plot of pressure that is applied to a clutch, or clutch pressure, versus time. The vertical axis represents rotational clutch pressure and clutch pressures increases from zero at the level of the horizontal axis in the direction of the vertical axis arrow. The horizontal axis represents time and time increases from the left side of the plot to the right side of the plot.

The second plot from the top of FIG. 11 is a plot of electric machine torque output versus time. The vertical axis represents electric machine torque output and electric machine torque output increases from zero at the level of the horizontal axis in the direction of the vertical axis arrow. The horizontal axis represents time and time increases from the left side of the plot to the right side of the plot. Horizontal line 1106 represents a "maximum touch torque," which is a torque that is generated by an electric machine to rotate the clutch at a predetermined speed when pressure within the clutch is within a first predetermined range of a touch pressure. Horizontal line 1104 represents a "minimum touch torque," which is a torque that is generated by an electric machine to rotate the clutch at a predetermined speed when pressure within the clutch is within a second predetermined range of a touch pressure. Horizontal line 1102 represents a "drag torque," which is a minimum torque that is generated by an electric machine to rotate the clutch at a predetermined speed when the clutch is fully open and the torque transfer capacity of the clutch is zero.

At time t30, the first phase of the sequence for determining a clutch touch pressure begins. In the first phase, an electric machine that rotates the clutch is operated in a speed control mode where the electric machine is rotated at a predetermined speed. The clutch pressure is zero or substantially zero (e.g., less than 0.36 bar) and torque of the electric machine is at the level of drag torque that rotates one portion of the clutch at a predetermined speed. The torque output of the electric machine is a drag level torque since the clutch is fully open.

At time t31, the second phase of the sequence for determining the clutch touch pressure begins. In the second phase, clutch pressure is increased to a fill pressure that is above the touch pressure to begin compressing clutch plates and friction plates. The electric machine remains in speed control mode while the clutch pressure is increased. The pressure increase at time t31 increases the rate that the clutch plates move toward a position where the clutch torque capacity begins to increase.

At time t32, the clutch pressure is at the fill pressure and the electric machine torque has increased above the minimum touch torque. The electric machine speed (not shown) remains at its requested speed.

At time t33, the third phase of the sequence for determining clutch touch pressure begins. In this example, the third phase begins with the electric machine torque being within a touch torque range (e.g., between the minimum and maximum touch torques). The third phase begins with the clutch pressure being reduced to a value of a current clutch touch pressure. Therefore, the present clutch touch pressure may be reported as the clutch pressure. The electric machine speed (not shown) is unchanged during these conditions.

At time t34, the fourth phase of the sequence for determining clutch touch pressure begins. In the fourth phase, the clutch pressure is reduced to near zero so the electric machine torque may be reduced to the drag torque level. The electric machine torque has remained in a desirable range, so an accurate clutch touch pressure may be delivered to the system for clutch control.

Like the sequence of FIG. 5, the sequence of FIG. 11 may be performed during predetermined conditions so that vehicle operation may not be disturbed. For example, the sequence of FIG. 11 may be performed when the transmission is engaged in park or neutral when the vehicle that includes the transmission is stationary.

Referring now to FIG. 12, a method for determining clutch control parameters is shown. The method of FIG. 12 may be stored as executable instructions in non-transitory memory of a controller of a system as described in FIGS. 1-4. The controller may apply sensors and actuators to adjust operating states of the system according to the method of FIG. 12. The steps of method 1200 may be performed when a set of predetermined conditions have been met. For example, method 1200 may be executed when a transmission is engaged in neutral or park and when vehicle speed is zero.

At 1202, applies default clutch fill time and learned clutch touch pressure. The clutch fill time and the clutch touch pressure may be retrieved from memory and applied by a controller to control clutch pressure and timing of opening and closing the clutch. Initially, the clutch fill time and clutch touch pressure may be predetermined values that are installed in controller memory and inserted into a clutch control strategy. The values may be determined during calibration of the controller that controls clutch opening and closing. Method 1200 proceeds to 1204.

At 1204, method 1200 operates an electric machine in a speed control mode and generates a clutch overfill condition where electric machine torque exceeds a predetermined overfill torque. Method 1200 also checks to determine if an over touch (e.g., clutch touch pressure causes electric machine torque to exceed a maximum clutch touch pressure). Method 1200 may generate the overfill condition by performing the sequence shown in FIG. 7. In particular, method 1200 may begin by commanding the clutch pressure to a zero pressure while the electric machine is operating in a speed control mode and rotating at a predetermined speed. Method 1200 may command the clutch pressure to a fill pressure and maintain the fill pressure for a duration of the clutch fill time that was determined at step 1202 plus an offset amount of time (e.g., 0.25 seconds). The clutch pressure is reduced from the fill pressure to the clutch touch pressure minus an offset pressure for a predetermined amount of time after the clutch pressure is reduced to the clutch touch pressure minus the offset pressure. If electric machine torque exceeds a touch torque, method 1200 may determine that a clutch overfill has occurred. Method 1200 may determine that an over touch condition has not occurred if electric machine torque has remained below a maximum touch torque. If a clutch overfill condition has been met, and if no over touch condition has occurred, method 1200 proceeds to 1206. Otherwise, method 1200 may increase the offset amount of time and/or increase the offset pressure and repeat step 1204.

Alternatively, method 1200 may generate a clutch under fill condition as shown in FIG. 6. In particular, method 1200 may begin by commanding the clutch pressure to a zero pressure while the electric machine is operating in a speed control mode and rotating at a predetermined speed. Method 1200 may command the clutch pressure to a fill pressure and maintain the fill pressure for a duration of the clutch fill time that was determined at step 1202 minus an offset amount of time (e.g., 0.25 seconds). The clutch pressure is reduced from the fill pressure to the clutch touch pressure minus an offset pressure for a predetermined amount of time after the clutch pressure is reduced to the clutch touch pressure minus the offset pressure. If electric machine torque is less than a touch torque, method 1200 may determine that a clutch under fill has occurred. Method 1200 may determine that a clutch under fill condition has not occurred if electric machine torque exceeds a maximum touch torque. If a clutch under fill condition has been met, method 1200 proceeds to 1206 and method 1200 may iteratively increase the clutch fill time until clutch overfill is detected. The clutch fill time may be adjusted to a time just that is just below a clutch fill time where clutch over fill occurs.

At 1206, method 1200 iteratively decreases the clutch fill time from the clutch fill time determined at step 1202 plus the offset amount of time by a predetermined amount of time and repeats the sequence shown in FIG. 7 while clutch overfill is detected. Once clutch overfill is no longer detected, the clutch fill time when the clutch is commanded to the fill pressure at which clutch overfill is no longer achieved is stored to controller memory as the clutch fill time that corresponds to the actual clutch fill time. Method 1200 proceeds to 1208 when the clutch fill time is determined.

At 1208, method 1200 applies a clutch fill time that is less than what was determined at 1206 and generates a clutch over touch by increasing the clutch pressure that was determined at 1202 by a predetermined amount of pressure. Method 1200 may generate the clutch over touch according to the sequence of FIG. 10. In particular, method 1200 may begin by commanding the clutch pressure to a zero pressure while the electric machine is operating in a speed control mode and rotating at a predetermined speed. Method 1200 may command the clutch pressure to a fill pressure and maintain the fill pressure for a duration of the clutch fill time that was determined at step 1206. The clutch pressure is reduced from the fill pressure to the clutch touch pressure plus an offset pressure for a predetermined amount of time after the clutch pressure is reduced to the clutch touch pressure plus the offset pressure. If electric machine torque exceeds a maximum touch torque while the clutch pressure is commanded to the clutch touch pressure plus the offset pressure, method 1200 may determine that a clutch over touch condition has occurred. Method 1200 may determine that an over touch condition has not occurred if electric machine torque has remained below the maximum touch torque. If a clutch over touch condition has occurred, method 1200 proceeds to 1210. Otherwise, method 1200 may increase the offset pressure and repeat step 1208.

At 1210, method 1200 iteratively decreases the clutch touch pressure from the clutch touch pressure commanded at step 1208 plus the offset pressure by a predetermined amount of pressure and repeats the sequence shown in FIG. 10 while clutch over touch is detected. Once clutch over touch is no longer detected, the clutch touch pressure when the clutch is commanded to the clutch touch pressure at which clutch over touch is no longer achieved is stored to controller memory as the clutch touch pressure that corresponds to the actual clutch touch pressure. Method 1200 proceeds to 1212 when the clutch touch pressure is determined.

At 1212, method 1200 sets the clutch fill time to the clutch fill time that was determined at step 1208 and sets the clutch touch pressure to the pressure that was determined at 1210. Method 1200 performs the sequence of FIG. 7 to verify that the determined clutch fill time and clutch touch pressure do not result in a clutch overfill condition. If a clutch over fill condition is found, method 1200 may repeat steps 1204-1210. If a clutch over fill condition is not found, method 1200 proceeds to 1214. Method 1200 may exit the electric machine from the speed control mode and enter torque control mode after the clutch control parameters are determined.

At 1214, method 1200 fully opens and fully closes the clutch using the clutch control parameters. Method 1200 may perform gear shifts to evaluate the performance of the newly determined clutch control parameters. These operations may be performed after the transmission is shifted into drive. Method 1200 exits.

Thus, the method of FIG. 12 automatically determines clutch control parameters. In particular, clutch touch detection and clutch fill time detection may be determined via monitoring electric machine torque when the electric machine is operating in a speed control mode.

The method of FIG. 12 provides for a method for determining a clutch fill time, comprising: adjusting a valve to flow a fluid to a clutch; and adjusting the clutch fill time based on an amount of time between adjusting the valve and a torque output of an electric machine increasing by more than a threshold amount of torque to maintain speed of the electric machine. In a first example, the method further comprises operating the electric machine in a speed control mode while the torque output of the electric machine is increasing. In a second example that may include the first example, the method further comprises adjusting the valve when a transmission that includes the clutch is engaged in park or neutral. In a third example that may include one or both of the first and second examples, the method further comprises adjusting a clutch touch pressure in response to the torque output of the electric machine. In a fourth example that may include one or more of the first through third examples, the method includes where the clutch touch pressure is adjusted in response to the torque output of the electric machine being less than a minimum clutch touch pressure. In a fifth example that may include one or more of the first through fourth examples, the method includes where the clutch touch pressure is adjusted in response to the torque output of the electric machine being greater than a maximum clutch touch pressure. In a sixth example that may include one or more of the first through fifth examples, the method includes where the touch pressure is a clutch pressure at which torque capacity of the clutch begins to increase from zero. In a seventh example that may include one or more of the first through sixth examples, the method further comprises operating the electric machine in a speed control mode prior to and during adjusting the valve to flow the fluid to the clutch.

The method of FIG. 12 also provides for a method for determining a clutch fill time, comprising: operating an electric machine in a speed control mode and monitoring a torque output of the electric machine while the electric machine is operating in the speed control mode; increasing a clutch pressure from substantially zero pressure to a clutch fill pressure and maintaining the clutch pressure for an amount of time; and adjusting the amount of time according to the torque output. In a first example, the method further comprises decreasing the clutch pressure from the clutch fill pressure to a clutch touch pressure. In a second example that may include the first example, the method further comprises adjusting the clutch touch pressure according to the torque output. In a third example that may include one or both of the first and second examples, the method includes where adjusting the amount of time includes increasing the amount of time in response to the torque output being less than a threshold torque. In a fourth example that may include one or more of the first through third examples, the method includes where adjusting the amount of time includes decreasing the amount of time in response to the torque output being greater than a threshold torque.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a constrained sense, because numerous variations are possible. For example, the above technology can be applied to powertrains that include different types of torque sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for determining a clutch fill time, comprising:
adjusting a valve to flow a fluid to a clutch; and
adjusting the clutch fill time based on an amount of time between adjusting the valve and a torque output of an electric machine increasing by more than a threshold amount of torque to maintain speed of the electric machine.

2. The method of claim 1, further comprising operating the electric machine in a speed control mode while the torque output of the electric machine is variable.

3. The method of claim 2, further comprising adjusting the valve when a transmission that includes the clutch is engaged in park or neutral.

4. The method of claim 1, further comprising adjusting a clutch touch pressure in response to the torque output of the electric machine.

5. The method of claim 4, where the clutch touch pressure is adjusted in response to the torque output of the electric machine being less than a minimum clutch touch pressure.

6. The method of claim 4, where the clutch touch pressure is adjusted in response to the torque output of the electric machine being greater than a maximum clutch touch pressure.

7. The method of claim 4, where the clutch touch pressure is a clutch pressure at which torque capacity of the clutch begins to increase from zero.

8. The method of claim 1, further comprising operating the electric machine in a speed control mode prior to and during adjusting the valve to flow the fluid to the clutch.

9. A vehicle system, comprising:
one or more torque sources;
a transmission including a plurality of clutches and gears;
a controller including executable instructions that cause the controller to operate one of the one or more torque sources in a speed control mode and perform an automatic clutch parameter determination sequence that generates a clutch fill time and a clutch touch pressure according to output torque of one of the one or more torque sources.

10. The vehicle system of claim 9, further comprising additional instructions that cause the controller to increase a pressure in one of the plurality of clutches to a fill pressure while operating the one of the one or more torque sources in the speed control mode.

11. The vehicle system of claim 10, further comprising additional instructions that cause the controller to decrease the pressure in one of the plurality of clutches such that torque output of the one of the one or more torque sources is greater than a drag torque and less than a touch torque.

12. The vehicle system of claim 11, further comprising additional instructions that cause the controller to:
decrease the pressure in one of the plurality of clutches to substantially zero pressure for a predetermined amount of time since the pressure in the one of the plurality of clutches caused torque output of the one or more torque sources to be greater than the drag torque and less than the touch torque.

13. The vehicle system of claim 9, further comprising additional instructions that cause the controller to increase a pressure in one of the plurality of clutches to a fill pressure while operating the one of the one or more torque sources in the speed control mode and increase an amount of time the fill pressure is applied to the one of the plurality of clutches in response to electric machine torque being less than a touch torque.

14. The vehicle system of claim 9, further comprising additional instructions that cause the controller to increase a pressure in one of the plurality of clutches to a fill pressure while operating the one of the one or more torque sources in the speed control mode and decrease an amount of time the fill pressure is applied to the one of the plurality of clutches in response to electric machine torque being greater than a touch torque.

15. The vehicle system of claim 9, further comprising additional instructions that cause the controller to increase or decrease a pressure in one of the plurality of clutches after reducing the pressure in the one of the plurality of clutches from a fill pressure during the automatic clutch parameter determination sequence in response to electric machine torque.

16. A method for determining a clutch fill time, comprising:

operating a torque source in a speed control mode and monitoring a torque output of the torque source while the torque source is operating in the speed control mode;

increasing a clutch pressure from substantially zero pressure to a clutch fill pressure and maintaining the clutch pressure for an amount of time; and adjusting the amount of time according to the torque source torque output.

17. The method of claim 16, further comprising decreasing the clutch pressure from the clutch fill pressure to a clutch touch pressure.

18. The method of claim 17, further comprising adjusting the clutch touch pressure according to the torque source torque output.

19. The method of claim 16, where adjusting the amount of time includes increasing the amount of time in response to the torque source torque output being less than a threshold torque.

20. The method of claim 16, where adjusting the amount of time includes decreasing the amount of time in response to the torque source torque output being greater than a threshold torque.

* * * * *